Patented Mar. 6, 1945

2,371,097

UNITED STATES PATENT OFFICE 2,371,097

CHEMICAL COMPOUNDS

Frank J. Cahn and Benjamin R. Harris, Chicago, Ill., assignors to The Emulsol Corporation, Chicago, Ill., a corporation of Illinois No Drawing. Application March 26, 1942,
Serial No. 436,330

24 Claims. (Cl. 260—404)

This invention relates to the preparation of water-soluble or water-dispersible chemical compounds which are characterized by possessing interface modifying properties rendering the same highly useful for the purposes hereinafter set forth.

An important object of the invention resides in the provision of a novel and effective method of producing the chemical compounds with which the present invention is concerned.

Another and important object is the preparation of certain chemical compounds having the useful properties described hereinafter in detail.

Other objects will become apparent in the light of the following detailed description of the invention.

In general, the new and useful compounds and reaction products of the present invention are most suitably prepared by reacting a carboxylic acid ester of an anhydride of an hydroxypolycarboxylic acid, the carboxylic acid radical of said ester containing less than 6 carbon atoms, with a carboxylic acid amide of a hydroxy primary or secondary amine, the carboxylic acid radical of which contains preferably at least four carbon atoms and especially from eight to eighteen carbon atoms. By way of illustration, this may be exemplified by reacting the acetic acid ester of citric acid anhydride with the lauric acid amide of monoethanolamine. In addition to the novelty of the method, the reaction products produced herein have never been disclosed heretofore and, therefore, their utility for the purposes hereinafter described has been unknown.

While many of the novel products of the present invention may best be defined in the form of reaction products, they and particularly some of the more potent constituents thereof can, at least in part, be characterized or described by way of structural formulae. Illustrative examples of such compounds which fall within the scope of the invention are as follows:

(1) 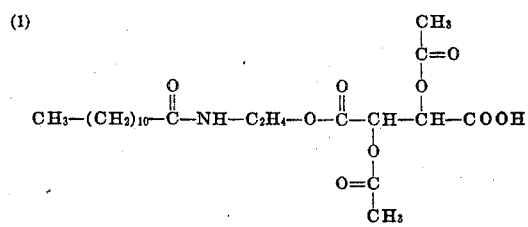

(2) 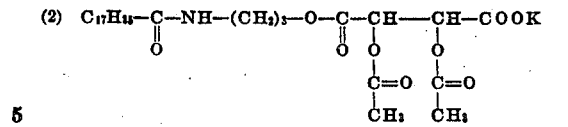

(3) 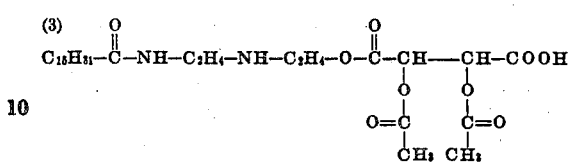

(4) 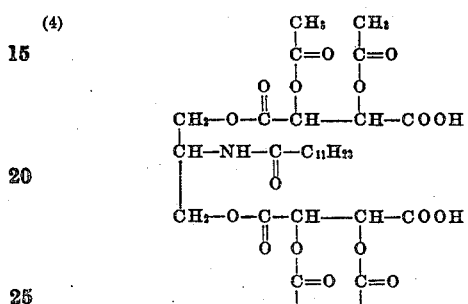

(5) 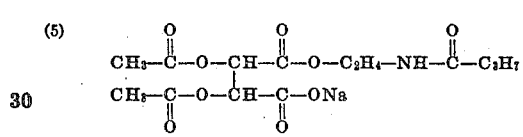

(6) 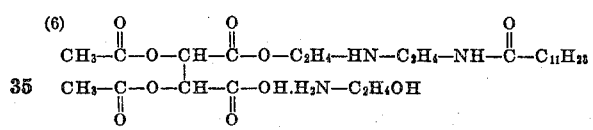

(7) 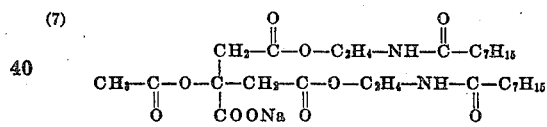

(8) 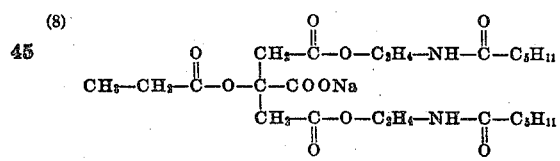

(9) 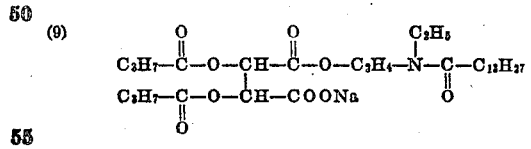

(10) 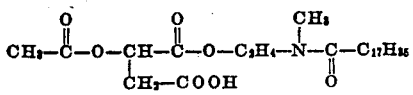

(11) 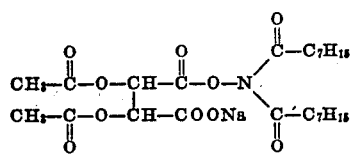

(12) 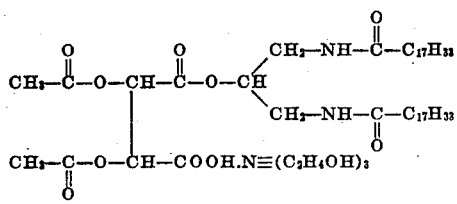

In order that the full significance of the invention may be made even more apparent, the following illustrative examples are set forth. It will be appreciated that the proportions of reacting ingredients, times of reaction, temperatures of reaction, and the like may be varied and that supplementary process of purification and the like may be resorted to wherever found desirable or convenient. These and other variations and modifications will be evident to those skilled in the art in the light of the guiding principles which are disclosed herein.

*Example A*

21.6 grams of di-acetic acid ester of tartaric acid anhydride were reacted with 25.3 grams of the lauric acid amide of monoethanolamine at 120 degrees C. for several minutes whereupon the reaction mass became homogeneous. The reaction product, which foamed well in alkaline and acid media and was stable in the presence of calcium ions, contained a substantial proportion of a compound having the following probable formula:

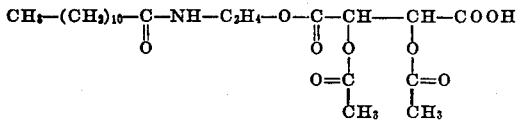

*Example B*

21.6 grams of diacetic acid ester of tartaric acid anhydride were reacted with 28.6 grams of the lauric acid amide of hydroxy-ethyl ethylene diamine at 115 degrees C.–125 degrees C. for several minutes whereupon the reaction mass became homogeneous. The reaction product had good surface active properties and contained a substantial proportion of a compound having the following probable formula:

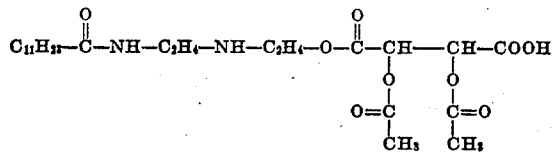

*Example C*

21.6 grams of the acetic acid ester of citric acid anhydride were reacted with 35.1 grams of the propionic acid amide of monoethanolamine at temperatures of the order utilized in Examples A and B. The resulting product, which possessed surface active properties, contained a substantial proportion of a compound having the following probable formula:

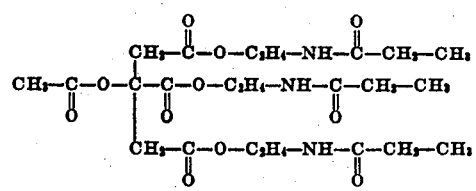

The hydroxy polycarboxylic acid anhydrides whose acetic acid esters and similar derivatives are reacted with the amides, in accordance with the present invention, may be selected from a large group including, for example, citric acid, tartaric acid, malic acid, hydroxy methylsuccinic acid, trihydroxyglutaric acid, mucic acid, saccharic acid, and the mono- and poly-hydroxy derivatives of adipic acid, pimelic acid, suberic acid, azelaic acid, sebacic acid, and the like. It is preferred to employ the acetic acid esters or like derivatives of the anhydrides of those hydroxy polycarboxylic acids which are water-soluble and of aliphatic character. These acids may contain other substituents such as CN, $NH_2$, $NO_2$, F, Cl, Br, I, $SO_3H$, phosphate, sulphate, SCN, etc., but, for best results, substituents should be absent. Of particular importance are citric and tartaric acids.

In place of the acetic acid ester derivatives of the anhydrides of the hydroxy polycarboxylic acids, I may employ any carboxylic acid derivative, preferably water-soluble and of aliphatic or fatty character and particularly containing not more than six carbon atoms although the invention is not so limited. Examples of such derivatives are those from propionic acid, butyric acid, valeric acid, maleic acid, succinic acid, and the like. Of particular utility, however, are the acetic acid ester derivatives.

The amides which are reacted with the acetic acid esters of the hydroxy polycarboxylic acid anhydrides may be derived from a large group of carboxylic acids and alcohol non-tertiary amines. Representative of such amides are, for example, including some of those set out hereinabove, the lauric acid amide of monoethanolamine, the oleic acid amide of monoethanolamine, the lauric and oleic acid amides of diethanolamine, the caprylic acid amide of hydroxy-ethyl ethylene diamine, the ricinoleic acid amide of monopropanolamine, and the like.

A representative list of carboxylic acids the amides of which with the alcohol non-tertiary amines are utilized in accordance with the present invention comprises straight chain and branched chain, saturated and unsaturated, carboxylic, aliphatic (including cycloaliphatic), fatty, aromatic, hydro-aromatic, and araliphatic acids including acetic acid, propionic acid, butyric acid, caproic acid, pimelic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acyloxy carboxylic acids such as $C_{17}H_{35}$—CO—O—$CH_2$—COOH; acids such as i-hydroxy stearic acid, dihydroxypalmitic acid, di-hydroxy-stearic acid, dihydroxybehenic acid, alpha - hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, amine, halogen, ketone and other groups. Of particular utility are the unsubstituted fatty acids containing from twelve to eighteen carbon atoms.

The alcohol non-tertiary amines the amides of which with the carboxylic acids are utilized in accordance with the present invention may be selected from an extensive group including symmetrical, unsymmetrical, normal and isoderivatives, such as monoethanolamine, diethanolamine, monopropanolamine, dipropanolamine, monobutanolamine, mono - isobutanolamine, monopentanolamine, dibutanolamine, dipentanolamine, mono- and di-hexanolamine, mono- and di-octanolamine, mono- and di-decylolamine, mono-laurylolamine, mono-hexadecylolamine, mono-octadecylolamine, mono - ethyl ethanolamine, mono-butyl ethanolamine, arylolamines and cyclic hydroxy amines such as cyclohexyl ethanolamine, N-cyclohexyl butanolamine, ethanolaniline, phenylethanolamine, p - amino phenol,

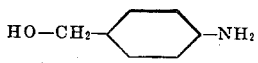

2 - methylamino-propan - diol - 1,3; 1 - phenylamino-propan-diol-2,3; 1-hydroxy-ethylamino-2, methoxy-propan-ol - 3; 2 - N-methylamino-propan-diol-1,3; monoethanol monopropanolamine, monoethanol monobutanolamine, alkylol polyamines such as alkylol derivatives of ethylene diamine, diethylene triamine, and triethylene tetra-amine as, for example, hydroxy-ethyl ethylene diamine; diglycerol mono-amine; diglycerol di-amine; hydroxy-amines derived from other polyhydric alcohols, including glycols, sugars and sugar alcohols such as ethylene glycol, diethylene glycol, dextrose, sucrose, sorbitol, mannitol and dulcitol;

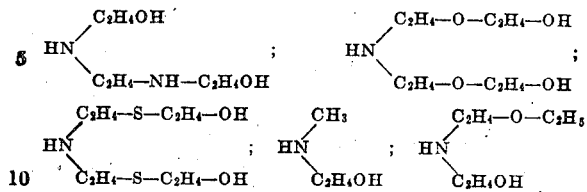

and the like; 1-amino-2,3-propanediol; 2-amino-1,3-propanediol; 2-amino-2-methyl-1,3-propanediol; trimethylol amino methane; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino - 2 - ethylol-1,3-propanediol; 2-amino-2-methyl-1,6-hexanediol; 1 - amino - 1,1 - dimethyl ethanol; trimethylol amino-methyl methane; trimethylol amino-methylol methane. Polymerized hydroxy non-tertiary amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like, may also be employed. The preparation of polymerized hydroxy amines is disclosed, for example, in United States Patent No. 2,178,173. Homologues and substitution derivatives of the above-mentioned hydroxy amines may also be utilized. Because of commercial and other considerations, monoethanolamine is especially desirable. It will be understood that the hydroxy primary and secondary amines may be utilized in pure, impure or commercial form. The alcohol or alkylol radicals of the alcohol amines or alkylolamines may contain substituent groups such as amino nitrile, carboxy, hydroxy, halogen, sulphate, sulphonic, phosphate, and the like and the sequence of carbon atoms therein may be interrupted by O,S, C=O, NH, NR where R is lower alkyl, and the like.

It will be understood that amides of any of the listed carboxylic acids with any of the listed alcohol non-tertiary amines may be utilized for reaction in accordance with our invention.

The reaction products of the present invention may be reacted with various alcohols such as butyl alcohol, octyl alcohol, lauryl alcohol, cetyl alcohol, oleyl alcohol, stearyl alcohol, as well as derivatives of polyhydroxy substances such as monostearin, monolaurin, mono-olein, di-laurin, di-olein, mono-cetyl ether of glycerol, diethylene glycol mono-oleate, diethylene glycol mono-laurate, and other alcohols such as those described hereinafter to produce reaction products having valuable properties. The reaction in such cases appears to be one of esterification between free carboxyl groups of the products hereinabove described and hydroxy groups of the alcohols. If desired, the free carboxyl groups may be converted to acyl halides and then reacted with the alcohols. The reaction may be accelerated by the use of the usual condensing agents such as sulphuric acid, chlorsulphonic acid, and the like. Such reactions may also be carried out between the products of the present invention, as described in the various examples listed hereinabove, and the products described in Patent No. 2,192,907, issued March 12, 1940. Particularly valuable products result from the interaction between the products of the present invention, as described in the various examples listed hereinabove, and such compounds as the mono-tartaric acid ester of glycerin, the mono-citric acid esters of ethylene glycol and diethylene glycol, the ester resulting from one mol of glycerin and two mols of tartaric acid, and, in general, the water-soluble and water-dispersible esters of aliphatic polyhydroxy substances with polycarboxylic and hydroxypolycarboxylic acids. Such esters are disclosed as intermediate products in the preparation of compounds disclosed in the aforementioned patent.

The reaction products may be used as such or they may be neutralized, in whole or in part, with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol-amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl mono-ethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl mono-ethanolamine; 1-amino-2,3-propanediol; 1,2-diaminopropanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, mono-methyl ethylene diamine, monoethyl diethylene tetraamine, mono-allyl amine, hydrazine and substituted hydrazine, aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrolidines, nicotine, and homologues and derivatives or substitution products thereof, and, in general, primary, secondary and tertiary amines substituted or not with other radicals, such as hydroxy, alkyl, aryl, cycloalkyl groups and the like; quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono- and di-ethanolamine; proteins and partial digestion or hydrolysis products thereof. It will be understood that these substituted ammonium compounds or organic nitrogenous bases may be utilized in pure, impure, or commercial form.

It will be understood that by the term "cation," as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

The compounds of our invention have utility in various arts in which interface modifying agents are employed. Many of them are resistant to precipitation by calcium and magnesium salts and are compatible with acid and alkali media. They may be utilized in washing and laundering and in the textile and related industries wherein they function for wetting, lathering, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics) such as rayon, cellulose, acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents of my invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. They possess bactericidal, germicidal, bacteriostatic, antiseptic, disinfectant, fungicidal, preserving and, in general, chemotherapeutic properties which render them useful in various environments such as tooth pastes, tooth powders, liquid dentifrices, mouth washes and the like. Many of them may also be used with effect in the preparation of metal and furniture polishes, shoe polishes, in rubber compositions, for breaking or demulsifying petroleum emulsions such as those of the water-in-oil type which are encountered in oil-field operations, in paints and the like, and for various other purposes which will readily occur to those versed in the art in the light of my disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating or detergent agents such as the higher molecular weight alkyl sulphates, phosphates, pyrophosphates, and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulpho-acetate, and the like; higher fatty acid partial esters of aliphatic polyhydric alcohols, such as monolaurin, mono-olein, monostearin, dilaurin, lauric acid mono-ester of ethylene glycol or diethylene glycol, stearic and oleic acid partial esters of polyglycerols, and the like; sulphuric and sulphonic derivatives of condensation products of alkylolamines and higher fatty acids; reaction products of phosphoric, pyrophosphoric, meta-phosphoric, tetraphosphoric, and polyphosphoric acids with higher molecular weight alcohols; Turkey-Red oils; compounds of the type of isopropyl naphthalene sodium sulphonate, and other classes of wetting agents, such as cationic agents, for example, lauryl amine and lauryl amine hydrochloride, lauryl pyridinium chloride, octadecyl pyridinium iodide, quaternary ammonium compounds generally, and the like.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized; and, in addition, any of the esters of the hydroxy polycarboxylic acid anhydrides listed above may be reacted with any of the amides described.

The term "poly" wherever used herein will be understood to be employed in its usual sense, namely, to denote two or more.

This application is a continuation-in-part of our prior application, Serial No. 385,685, filed March 28, 1941.

What we claim as new and desire to protect by Letters Patent of the United States is:

1. A process of preparing new chemical compounds which comprises condensing a carboxylic acid amide of an alcohol non-tertiary amine with a carboxylic acid ester of an aliphatic hydroxy polycarboxylic acid anhydride, the carboxylic acid radical of said ester containing less than 6 carbon atoms.

2. A process which comprises condensing a fatty acid amide of a hydroxy-alkyl primary amine, the fatty acid radical of which contains from 8 to 18 carbon atoms, with an aliphatic carboxylic acid ester of an aliphatic hydroxy polycarboxylic acid anhydride, the aliphatic carboxylic acid radical of said ester containing less than 6 carbon atoms.

3. A process of preparing new chemical compounds which comprises condensing a fatty acid amide of an aliphatic hydroxy-alkyl primary amine, the fatty acid radical of which contains at least 6 carbon atoms, with a lower molecular weight fatty acid ester of a water-soluble aliphatic hydroxy dicarboxylic acid anhydride, the lower molecular weight fatty acid radical of said ester containing less than 6 carbon atoms.

4. A process of preparing new chemical compounds which comprises condensing a fatty acid amide of monoethanolamine, the fatty acid radical of which contains from 8 to 18 carbon atoms, with a lower molecular weight fatty acid ester of a water-soluble aliphatic hydroxy polycarboxylic acid anhydride, the lower molecular weight fatty acid radical of said ester containing less than 6 carbon atoms.

5. A process of preparing new chemical compounds which comprises condensing the lauric acid amide of monoethanolamine with a lower molecular weight aliphatic monocarboxylic acid mono ester of a water-soluble aliphatic hydroxy polycarboxylic acid anhydride, the lower molecular weight aliphatic carboxylic acid radical of said ester containing less than 6 carbon atoms.

6. A process of preparing new chemical compounds which comprises condensing a carboxylic acid amide of an alcohol non-tertiary amine with an acetic acid ester of a hydroxy-polycarboxylic acid anhydride.

7. A process of preparing new chemical compounds which comprises condensing a fatty acid amide of an aliphatic hydroxy-alkyl primary amine, the fatty acid radical of which contains from 8 to 18 carbon atoms, with a water-soluble acetic acid ester of an aliphatic hydroxy-polycarboxylic acid anhydride.

8. A process of preparing new chemical compounds which comprises condensing the lauric acid amide of monoethanolamine with an acetic acid ester of a hydroxy-polycarboxylic acid anhydride.

9. A process of preparing new chemical compounds which comprises condensing the lauric acid amide of hydroxy-ethyl ethylene diamine with a water-soluble acetic acid ester of an aliphatic hydroxy-polycarboxylic acid anhydride.

10. A process of preparing new chemical compounds which comprises condensing a fatty acid amide of an aliphatic hydroxy-alkyl primary amine the fatty acid radical of which contains at least 6 carbon atoms, with an acetic acid ester of an anhydride selected from the group consisting of tartaric acid and citric acid.

11. From water-soluble to water-dispersible chemical compounds comprising the acetic acid ester of citric acid at least one carboxyl group of which is ester-linked to a carboxylic acid amide of an alcohol non-tertiary amine, and salts thereof.

12. The mono-ester of lauric acid monoethanolamide with the acetic acid ester of citric acid, and salts thereof.

13. From water-soluble to water-dispersible chemical compounds comprising esters of carboxylic acid esters of aliphatic hydroxy polycarboxylic acids, the carboxylic acid radical of said esters containing less than 6 carbon atoms with carboxylic acid amides of hydroxy-alkyl primary amines, the carboxylic acid radical of said amides containing at least 6 carbon atoms.

14. A process of preparing new chemical compounds which comprises condensing an amide containing an esterifiable hydroxy group with a carboxylic acid ester of an aliphatic hydroxy polycarboxylic acid anhydride to esterify said esterifiable hydroxy group through a carboxyl group of said polycarboxylic acid anhydride.

15. A process of preparing new chemical compounds which comprises condensing a fatty acid amide containing an esterifiable hydroxy group, the fatty acid radical of which amide contains at least eight carbon atoms, with an acetic acid ester of a water-soluble polycarboxylic acid anhydride to esterify said esterifiable hydroxy group through a carboxyl group of said polycarboxylic acid anhydride.

16. A process of preparing new chemical compounds which comprises condensing a carboxylic acid amide of an hydroxy amine, the carboxylic acid radical containing at least eight carbon atoms, with a carboxylic acid ester of an aliphatic hydroxy polycarboxylic acid anhydride.

17. From water-soluble to water-dispersible chemical compounds in accordance with the general formula

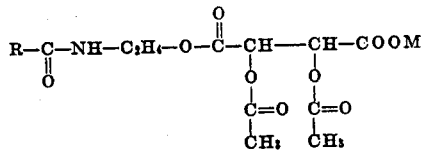

where

is the carboxylic acyl radical of a fatty acid containing from eight to eighteen carbon atoms, and M is a cation.

18. From water-soluble to water-dispersible chemical compounds comprising carboxylic acid esters of aliphatic hydroxy-polycarboxylic acids, the carboxylic acid radical of which contains less than 6 carbon atoms, at least one carboxyl group of said hydroxy-polycarboxylic acid being ester-linked to a carboxylic acid amide of an alcohol non-tertiary amine through a hydroxy group of the radical of the alcohol non-tertiary amine.

19. From water-soluble to water-dispersible chemical compounds comprising aliphatic carboxylic acid esters of aliphatic hydroxy-polycarboxylic acids, the aliphatic carboxylic acid radical of which contains less than 6 carbon atoms, at least one carboxyl group of said hydroxy-polycarboxylic acid being ester-linked to a fatty acid amide of an aliphatic hydroxy-alkyl primary amine through a hydroxy group of the radical of the hydroxy-alkyl primary amine.

20. From water-soluble to water-dispersible chemical compounds in accordance with the general formula

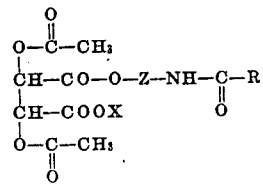

wherein

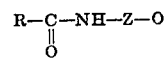

is the radical of an amide of an hydroxy-alkyl primary amine with a fatty acid containing at least 6 carbon atoms, and X is a cation.

21. From water-soluble to water-dispersible chemical compounds comprising acetic acid esters of aliphatic hydroxy-polycarboxylic acids, at least one carboxyl group of said hydroxy-polycarboxylic acid being ester-linked to a fatty acid amide of a hydroxy-alkyl primary amine through a hydroxy group of the radical of the hydroxy-alkyl primary amine, the fatty acid radical of said amide containing at least 6 carbon atoms.

22. From water-soluble to water-dispersible chemical compounds in accordance with the general formula

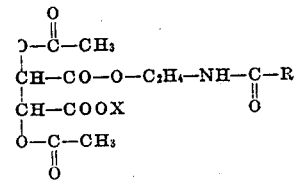

wherein

is a fatty acid acyl radical containing at least 6 carbon atoms, and X is a cation.

23. From water-soluble to water-dispersible chemical compounds comprising carboxylic acid esters of aliphatic hydroxy-polycarboxylic acids, the carboxylic acid radical of which contains less than 6 carbon atoms, at least one carboxyl group of said hydroxy-polycarboxylic acid being ester-linked to a carboxylic acid amide containing at least four carbon atoms and an esterifiable hydroxy group, said ester-linkage occurring through said esterifiable hydroxy group of said amide.

24. From water-soluble to water-dispersible chemical compounds comprising acetic acid esters of water-soluble hydroxy-polycarboxylic acids, at least one carboxyl group of said hydroxy-polycarboxylic acids being ester-linked to a fatty acid amide of a hydroxy amine through a hydroxy group of the radical of the hydroxy amine, the fatty acid radical of said amide containing at least 8 carbon atoms.

FRANK J. CAHN.
BENJAMIN R. HARRIS.